UNITED STATES PATENT OFFICE.

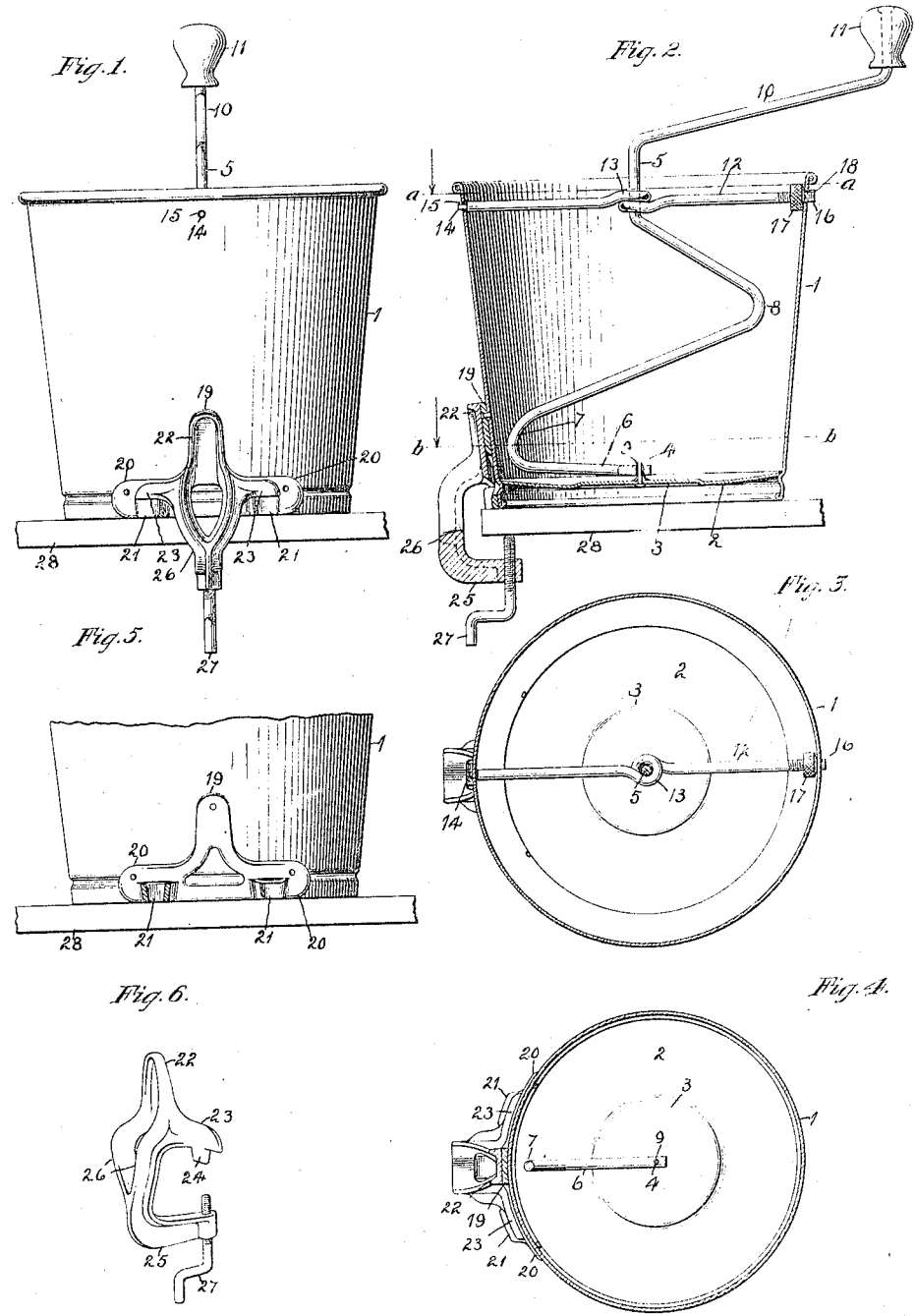

CARL A. ROSELAND, OF ROCKFORD, ILLINOIS.

DOUGH MIXER OR KNEADER.

1,042,278.  Specification of Letters Patent.  Patented Oct. 22, 1912.

Application filed March 31, 1911. Serial No. 618,190.

*To all whom it may concern:*

Be it known that I, CARL A. ROSELAND, a citizen of the United States, residing at Rockford, in the county of Winnebago and State of Illinois, have invented certain new and useful Improvements in Dough Mixers or Kneaders, of which the following is a specification.

The object of this invention is to construct a dough mixer or kneader in which the agitator and handle are integral, in which the agitator is held against displacement by a bend located beneath a cross-bar; in which the agitator is pivotally connected to the bottom of the vessel and in which a clamp is employed to hold the vessel firmly on its support.

In the accompanying drawings, Figure 1 is an elevation as seen from the face showing the clamp. Fig. 2 is a vertical central section. Fig. 3 is a transverse section on dotted line *a a* Fig. 2. Fig. 4 is a transverse section on dotted line *b b* Fig. 2. Fig. 5 is a face elevation of the lower portion of the vessel. Fig. 6 is a perspective view of the clamp.

The vessel 1 is formed with a bottom 2 having a raised center 3. A stud 4 projects upwardly from the raised center.

An agitator comprises the vertical portion 5, the substantially horizontal portion 6 and the two intermediate bends 7 and 8. The portion 6 has a hole 9 in its free end which receives the stud 4. The vertical portion 5 has a handle 10 formed integral therewith and a knob 11 is connected to the free end of this handle. A cross-bar 12 has a center coil 13 forming a bearing for the vertical portion 5 of the agitator. One end of this cross-bar is reduced forming a projection 14 which is located in an opening 15 in the side of the vessel 1 near its upper open end. The other end of this cross-bar 12 is formed with screw-threads 16 in connection with which is turned a nut 17. This screw-threaded end is located in an opening 18 in the side of the vessel near its upper open end and diametrically opposite the opening 15. The bar 12 is placed in position and removed from the vessel by flexing either the vessel or rod, or both. By forming the agitator and handle integral, the agitator may be passed through the coil 13 of the cross-bar 12. The nut 17 is turned on the screw-threaded end of the bar 12 as far as it will go. This end of the bar is then placed in the opening 18 in the vessel until the projection 14 of the other end of the bar will enter the hole 15 in the vessel and prevented from further movement by the shoulder formed at the junction of the projection 14 with the rod. The nut 17 is then turned on the rod 12 until it contacts with the inner face of the vessel which will hold the bar 12 in connection with the vessel in a fixed position. The coil 13 will be located vertically over the stud 4 thereby giving two bearings for the agitator which will hold the agitator against lateral movement. As the upper section of the bend 8 is located directly beneath the coil 13, the agitator will be held against vertical movement which will hold the lower end of the agitator in connection with the stud 4.

The ends of the bends 7 and 8 of the agitator are substantially the same distance from the vertical axes of rotation of the agitator, but the flaring of the upper end of the vessel allows more room between the side of the vessel and bend 8 than there is between the bend 7 and the wall of the vessel. The bend 7 is intended to rotate as close to the wall of the vessel as practical, leaving only a working space. By supporting the agitator at both ends greater strain can be imparted to it than when supported at one end only.

In order to hold the vessel firmly on a support, I have riveted to the outer wall of the vessel and at its lower end, a bracket composed of the vertical section 19 and two horizontal sections 20. The horizontal sections are each formed with a tapering socket 21 being larger at its upper end.

A clamp comprises the upwardly extending branch 22, two laterally extending branches 23, each of which has a depending hook 24, and a horizontal branch 25 is connected to the lateral branches by the vertical sections 26. A screw 27 is turned in connection with the horizontal branch 25. The hooks 24 are located in the sockets 21 and the screw is turned up against the underface of the support 25 as shown at Fig. 2. The hooks will pull down on the bracket, and the upwardly extending branch 22 will contact with the section 19 of the bracket thereby preventing the tipping of the vessel. By withdrawing the screw 27, the clamp can be removed which will liberate the vessel.

I claim as my invention—

1. In a dough mixer, a vessel, a cross bar mounted thereon and having a continuously walled opening therethrough, and an agitator journaled in the opening in the cross bar and formed from a single rod, said rod having its upper end offset to form a handle above the cross bar and its lower portion reversely bent to form agitator arms, the bends being sufficiently curved to permit the removal of the rod from and its replacement in the cross bar, by longitudinally moving it through the opening.

2. In a dough mixer, a vessel, a cross bar detachably mounted thereon, and an agitator journaled in the cross bar and formed from a single rod, said rod having its upper end above the cross bar offset to form a handle and its lower portion below the cross bar reversely bent to form agitator arms, the bends being sufficiently curved to permit the removal of the rod longitudinally from and its replacement in the cross bar when the latter is detached from the vessel, and a journal bearing in the vessel for the lower end of the rod.

3. In a dough mixer, a vessel, a cross bar detachably mounted thereon, and an agitator journaled in the cross bar and formed from a single rod, said rod having its upper end above the cross bar offset to form a handle and its lower portion below the cross bar reversely bent to form agitator arms, the bends being sufficiently curved to permit the removal of the rod longitudinally from and its replacement in the cross bar when the latter is detached from the vessel, and the first of said bends being directly beneath the cross bar and preventing the upward movement of the agitator when in a vertical position, and a journal bearing in the vessel for the lower end of the agitator and detachably engaged by the same, said agitator being maintained in engaged relation with the journal bearing when the cross bar is mounted on the vessel.

4. A dough mixer or kneader comprising a vessel, a single integral bar spanning the open end of the vessel having one end reduced and located in an opening in the vessel and its other end screw-threaded and located in an opening in the vessel diametrically opposite the first mentioned opening, the bar being removable and replaceable by relatively flexing it and the vessel, a nut adjustably mounted on the screw-threaded end and located adjacent to the inner face of the vessel, and an agitator rotatably mounted on the bar and extending into the vessel.

In testimony whereof I have hereunto set my hand in presence of two subscribing witnesses.

CARL A. ROSELAND.

Witnesses:
A. O. BEHEL,
E. D. E. N. BEHEL.